United States Patent
Maurer et al.

[11] 3,899,351
[45] Aug. 12, 1975

[54] FORMATION OF ELECTRODES FOR ALKALINE BATTERIES

[75] Inventors: Dean William Maurer, Berkeley Heights; Leona Louise Schull, Fanwood, both of N.J.

[73] Assignee: Bell Telephone Laboratories, Incorporated, Murray Hill, N.J.

[22] Filed: June 12, 1974

[21] Appl. No.: 478,505

[52] U.S. Cl. ................ 136/34; 136/24; 136/76
[51] Int. Cl. .......................... H01m 35/30
[58] Field of Search ........... 136/76, 75, 29, 28, 34, 136/24, 30, 31, 20, 78; 204/48, 49, 50 R

[56] References Cited
UNITED STATES PATENTS

| | | |
|---|---|---|
| 3,424,618 | 1/1969 | Weilnbock ..................... 136/76 |
| 3,507,699 | 4/1970 | Pell et al. ........................ 136/76 |
| 3,790,454 | 2/1974 | Henderson et al. .............. 136/76 X |

*Primary Examiner*—Anthony Skapars
*Attorney, Agent, or Firm*—W. G. Nilsen

[57] ABSTRACT

A process is described for the fabrication of aqueous alkaline batteries in which the electrodes are formed (cycled to remove undesirable ions and surface material from the electrode) under unusual conditions. These unusual conditions involve a charge/discharge cycle at an unusually high current rate in highly concentrated basic aqueous electrolyte at a temperature from 40°C to the boiling point of the electrolyte. Formation carried out in this way is far more rapid than by traditional methods and accomplishes the same purposes. Further, this procedure for forming the electrodes can be carried out on a continuous basis which is economically desirable in the commercial manufacture of alkaline batteries.

11 Claims, 4 Drawing Figures

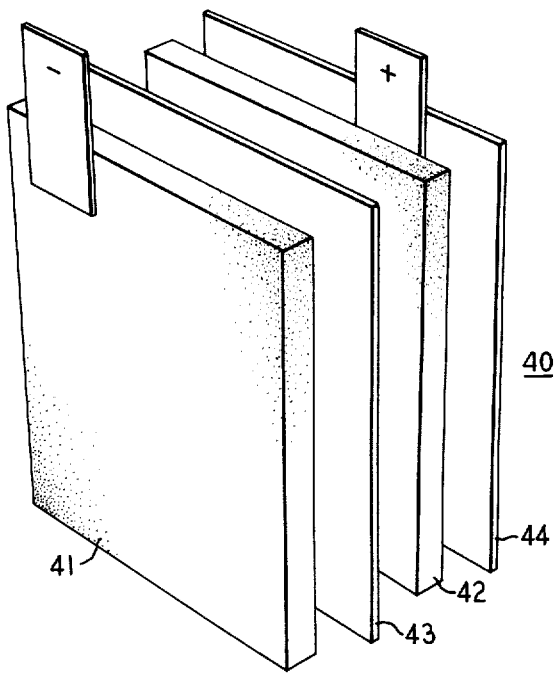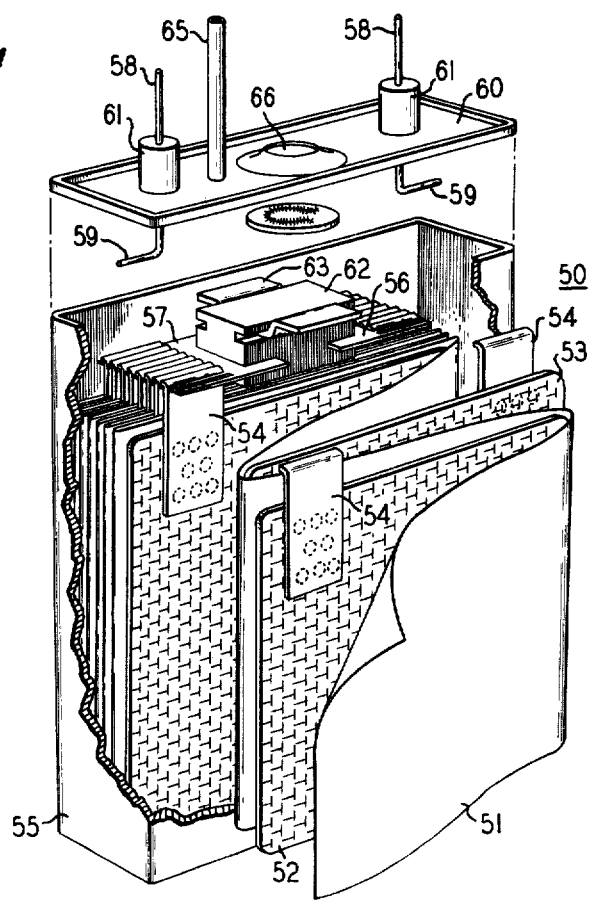

FORMATION OF ELECTRODES FOR ALKALINE BATTERIES

FIELD OF THE INVENTION

The invention is a process for the fabrication of aqueous alkaline cells and in particular involves formation of electrodes for aqueous alkaline cells.

DESCRIPTION OF THE PRIOR ART

Alkaline batteries have recently assumed increased importance both in home appliance markets and industrial markets principally because of their capacity for high charge and discharge rates. Methods of manufacture have emphasized not only increased capacities, but also increased charge and discharge rates. Traditional practice has been to impregnate the electrodes in their discharged condition and then to cycle electrolytically the electrodes prior to incorporation in the battery. This electrolytic cycling procedure is called forming the electrodes. Typical electrodes for alkaline batteries are nickel electrodes, cadmium electrodes, zinc electrodes, silver electrodes and mercury electrodes.

Formation of the electrodes prior to incorporation in the battery is necessary for two reasons. First of all, some impregnation processes leave certain ions in the electrode which interfere with the electrolytic process in battery operation. For example, the nitrate ion if left in the electrode results in self-discharge which drastically reduces both the shelf life and the active life of the batteries. Second, some electrodes after impregnation have accumulated active material on their surface. If this active material is not removed, it flakes off during the active life of the battery which results in drastic reduction of the life of the battery.

Typical formation procedures require recycling of approximately three to 10 times. This recycling is typically carried out at quite slow rates normally requiring 2 to 10 hours to fully charge the electrodes. This extensive procedure is required to completely remove active material on the surface of the electrode and to remove unwanted ions from the electrode. Thus, a complete formation process typically requires up to 3 days. Attempts to increase the charge/discharge rates often leads to mechanical weaknesses of the electrodes. These long formation times also make it inconvenient to use a continuous formation process which is economically desirable for commercial production of electrodes for alkaline batteries.

SUMMARY OF THE INVENTION

The invention is a process for the fabrication of aqueous alkaline batteries in which at least one of the electrodes is formed under unusual conditions. Formation refers to the procedure (carried out after impregnation and before final fabrication of the batteries) in which the electrode is cycled (charged and discharged) to put the electrode in condition for battery operation. In the inventive process the formation is carried out at unusually high rates ranging in current from four to 10 times the ampere-hour capacity of the battery. For example, for a capacity of 1 ampere/hr charging and discharging rates would vary from four to 10 amperes. These high formation rates are made possible without detrimental effects to the electrodes by the use of an aqueous electrolyte with unusually high concentrations of strong base. The concentration of base in the electrolyte should exceed 4 Molar and may range up to the saturation concentration of the solution. Further, the basicity constant of the base used in the electrolyte should exceed 0.1. Typical bases are sodium hydroxide and potassium hydroxide. Preferred concentration is from 7 to 8 Molar both for convenience in making up the electrolyte and the rapid formation made possible. In order to insure both the rapid results obtained and freedom of detrimental effects to the electrode due to the high currents used, the formation procedure is carried out in the temperature range between 40°C and the boiling point of the electrolyte. The preferred temperature range is from 50° to 60° since above 60° no advantages are obtained and increased temperatures are disadvantageous because of the corrosive nature of the electrolyte solution and detrimental crystal changes in the electrode. The formation procedure is applicable to a large variety of electrodes used in alkaline batteries including nickel electrodes, cadmium electrodes, zinc electrodes, silver electrodes and mercury electrodes. Nickel and cadmium electrodes are of particular interest because of the economic importance of these batteries. When the formation process is carried out in accordance with the invention, often only one charge/discharge cycle is required to remove surface deposits and to remove unwanted ions from the plaque. This formation procedure can be carried out in less than 30 minutes and usually in less than 12 minutes for charge and discharge. It is also easily adaptable to a continuous formation procedure. The high current densities used in the process do not have any adverse effects on the structural integrity of the electrode and electrodes made by this process have capacities as great as electrodes made by formation processes which require much longer time periods.

BRIEF DESCRIPTION OF THE DRAWING

FIG. 3 shows a perspective view of electrodes and separators for alkaline batteries made in accordance with the invention; and FIG. 4 shows a perspective view partly in section of an alkaline battery employing multiple positive and negative electrodes made in accordance with the invention.

DETAILED DESCRIPTION

1. The Inventive Procedure

Figure 1:
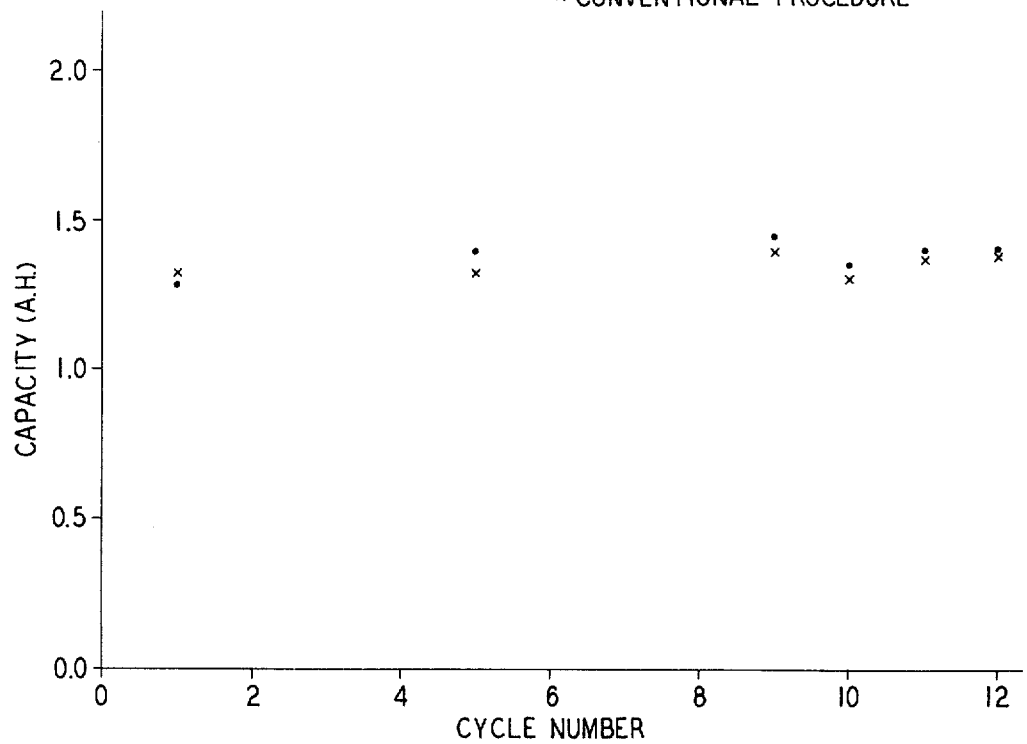
FIG. 1 shows a graph on coordinates of battery capacity in ampere hours vs cycle number which summarizes data on the capacity of electrodes formed using the inventive procedure and a conventional procedure.

The invention is a procedure as well as the resulting product for the fabrication of aqueous alkaline batteries in which one or more of the electrodes is formed under special conditions. The benefits of rapid formation without detriment to the electrode depend on close adherence to certain processing parameters during the formation procedure. In order to avoid stress effects from the high currents, the formation procedure is carried out at temperatures between 40°C and the boiling point of the electrolyte. Below 40°C, stress effects on the electrode are possible; above the boiling point, the formation is inconvenient to carry out and no benefits are obtained. For convenience, a limit of 50°–60°C is preferred since no benefits are obtained above 60°C and possible boiling of the electrolyte is undesirable because of its highly corrosive nature. Also, above 60°C, the electrode may lose capacity due to crystal changes.

The aqueous electrolyte contains strong base (basicity constant greater than 0.1) with concentration between 4 Molar and the saturation concentration of the solution. The high concentration of base not only permits rapid formation but also insures complete removal of active material on the electrode surface. Below 4 Molar complete removal is not assured. A concentration range of 7–8 Molar if preferred for KOH and 4.5 to 5.5 Molar for NaOH because of convenience and the rapid formation obtained. Also, KOH and NaOH are preferred because these bases are strong, readily available and inexpensive.

The rapid formation procedure also requires that the charge and discharge rate be between four and 30 times the capacity of the battery. Above the upper limit, there is danger of producing stress effects on the electrode; below the lower limit, the procedure is wasteful of time. The formation procedure described above not only yields electrodes of comparable capacity as previous methods, removes surface material from the electrodes, and removes undesirable ions from the electrodes but also permits the use of continuous formation procedures.

2. Comparison of Electrodes Fabricated by the Inventive Procedure and by Conventional Procedures Experiments were carried out to demonstrate that electrodes made by the inventive formation procedure are essentially equivalent to electrodes made by conventional procedures. This was done both for negative electrodes and positive electrodes.

For the positive electrode the comparison was carried out using a nickel electrode. A 4 inch × 4 inch nickel plaque was impregnated using an electrolytic procedure at elevated temperature. These plaques have theoretical capacities of approximately 2 ampere hours. Six of these plaques were then formed using the inventive procedure. They underwent one charge-discharge formation cycle at a rate of 40 amperes for 8 minutes. This formation cycle was carried out in 5 Molar aqueous sodium hydroxide at a temperature between 80° and 90°C. As is indicated by the electrode capacity and charge-discharge conditions, the charge cycle included considerable overcharge and the discharge cycle included electrode reversal.

For comparison, six nickel electrodes which were impregnated in the same way as above were formed using a conventional procedure. Nine charge-discharge cycles were used with a charge-discharge rate of 1 ampere for 4 hours. The same electrolytic solution was used as above but the formation was carried out at room temperature. In both formation procedures the cells were flooded and a cadmium electrode was used as the counter-electrode. The counterelectrode was located approximately three-fourths inch from the positive electrode. After formation in each procedure the electrode was removed, brushed, washed to remove sodium hydroxide, and dried.

For each electrode the capacity was measured by first charging the electrode against a cadmium counter-electrode at a rate of 1 ampere for 4 hours. The electrode was then discharged at a rate of 1 ampere to a voltage of 0.6 volts. Although the discharge was carried out down to a voltage of 0.6 volts, the measured capacity was taken as the battery capacity obtained down to a voltage of one volt. This data as a function of repeated charge-discharge cycles is summarized in FIG. 1. These charge-discharge cycles were carried out in 7 Molar KOH in water. Each point on the graph in FIG. 1 represents an average of six electrodes. The dots refer to formation by the inventive process. The crosses represent electrodes made by the conventional formation procedure. As can be seen, the capacities of electrodes made by the two procedures are essentially the same.

Analytical chemistry studies were also carried out on these electrodes to determine if unwanted ions were removed from the plaques. In electrolytic impregnation procedures, nitrate ions are left in the plaque and must be removed during formation. Chemical tests carried out on electrodes formed conventionally and formed using the inventive process showed that nitrate ions were removed in each case. These tests were sufficiently sensitive to detect nitrate ions in the concentration range of 100 parts per million. It was also observed that surface material on the plaques was completely removed by either procedure.

A similar comparison was also carried out for the negative electrodes. Here a cadmium electrode was used to carry out the comparison. Nickel plaques with dimensions of approximately 1½ inch × 1½ inch were electrolytically impregnated at elevated temperatures. Two electrodes were rapidly formed using a single charge-discharge cycle at a rate 10 times the capacity of the electrode for 8 minutes. The formation was carried out in 7 Molar aqueous KOH at approximately 80°C. For comparison, two electrodes impregnated in the same way as above were formed using a conventional procedure. These electrodes were subjected to nine charge/discharge cycles at a rate of one-half the capacity of the electrode for 4 hours. This conventional procedure was carried out in the same electrolyte as the inventive procedure but at room temperature. The capacity was measured by discharging the fully charged electrode to a voltage of one volt. The two electrodes formed according to the inventive procedure yielded capacities of 421 and 402 milliampere hours. The electrodes formed conventionally yielded capacity of 402 and 382 milliampere hours. These results show that the negative electrodes formed conventionally or much more rapidly in accordance with the inventive procedure yield substantially identical capacity. Again, both procedures remove surface material from the plaques.

3. Continuous Formation Procedure

Figure 2:
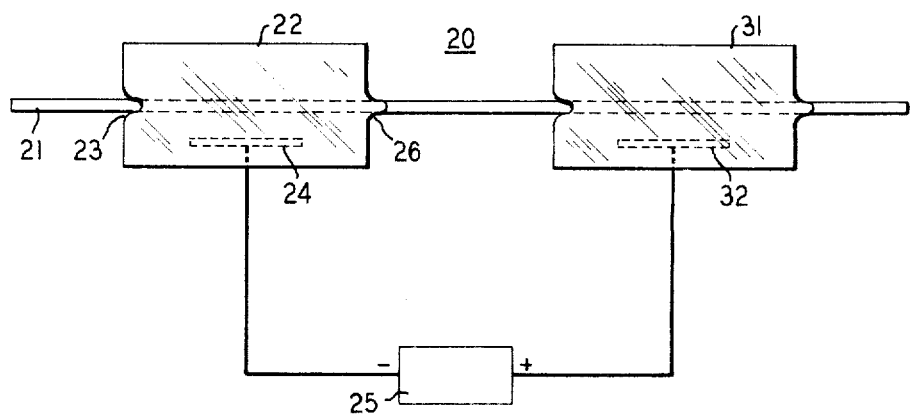
FIG. 2 shows in diagram form an apparatus used for continuously forming electrodes for alkaline batteries in accordance with the invention.

Because of the short cycle time and the fact that a single cycle is usually sufficient for complete formation, the inventive process is particularly adaptable to a continuous formation procedure. FIG. 2 shows a diagram of a continuous formation apparatus 20. For purposes of illustration, formation of the positive electrode (for example, a nickel electrode) is described, but the description is easily adaptable to a negative electrode such as a cadmium electrode. The electrode 21 in a form of a long continuous strip is introduced into the charging tank 22 through an opening 23 which limits liquid electrolyte from running out of the tank. Also contained in the charging tank is a counter-electrode 24 connected to the negative side of a power supply 25. Contained in the charging tank is an electrolyte made up of 7 Molar KOH in water. The counterelectrodes may be separate electrodes or made part of the tank wall. The counter-electrodes shown here are inert metal electrodes. However, a variety of electrodes may be used provided they permit charging of the nickel electrodes. Such electrodes include the use of the side walls of the tank to electrolyze water with the liberation of hydrogen gas.

In this particular arrangement the end walls of the tank are insulating and there is no electrolyte bridge connecting the charging tank and the discharging tank 31. The impregnated and now charged electrode exits the tank through an opening 26 which prevents electrolyte from coming out of the charge tank. The continuous electrode now enters the discharge tank 31 which again has a counterelectrode 32 connected to the positive side of the same power supply. The arrangements whereby the electrode enters and exits the discharge tanks are similar to that found in the charging tank. The electrolyte is also the same as in the charging tank. Again the end walls of the discharge tank are electrically insulating and there is no electrical connection between the two tanks except that the continuous electrode is a conducting path between the electrolyte in the two tanks. On completion of the formation cycle at the end of the discharge tank, the electrode is again in the discharged condition.

A similar continuous formation process can be used for the negative electrode. In this case the positive side of the power supply is connected to the charging tank and the negative side to the discharging tank. Also a suitable counter-electrode must be provided as, for example, an inert electrode.

On completion of the formation process, the electrode is brushed and washed to remove excess electrolyte and surface material and then dried. The continuous electrode is then cut into sizes appropriate for individual cells.

4. Illustrative Products Made by the Inventive Process

A particular alkaline cell 40 made by the inventive procedure is shown in FIG. 3. This figure shows several components of an alkaline battery. The negative electrode 41 is a cadmium electrode made in accordance with the invention. The positive electrode 42 is a nickel electrode made in accordance with the invention. Also shown are separators 43 and 44 used to electrically insulate the negative electrode from the positive electrode. Here the separators are made from microporous polymeric material. A multiplicity of such positive electrodes may be assembled so as to make up a completed battery. The electrolyte in this particular battery is a 30% by weight KOH in water.

FIG. 4 shows a cutaway view of a nickel-cadmium cell 50 made in accordance with the invention. The cell is made up of a separator 51 typically made of polypropylene, a negative electrode 52 and positive electrode 53, together with metal tabs 54 and outer can 55. The metal tabs are connected together by a comb structure for negative 56 and positive 57 electrodes. Electrical connection is made to battery posts 58 by means of a metal strip 59. The metal posts are attached to the cover plate 60 by means of a compression seal 61. An insulating support 62 holds the comb structure in place. A metal tab 63 connected to the insulating structure attaches to the battery cover 60 on assembly. Also shown is the fill tube 65 and the battery vent 66.

What is claimed is:

1. A process for the fabrication of alkaline cells in which at least one of the electrodes is made by a series of steps comprising impregnating a nickel plaque and forming the impregnated nickel plaque characterized in that forming is carried out in an aqueous electrolyte containing a base with a basicity constant greater than 0.1 with concentration between 4 Molar and the saturation concentration of the aqueous electrolyte with forming temperature between 40°C and the boiling temperature of the aqueous electrolyte and with a charge/discharge rate in amperes from 4 to 10 times the ampere-hour capacity of the electrode.

2. The process of claim 1 in which the base is selected from the group consisting of potassium hydroxide and sodium hydroxide.

3. The process of claim 2 in which the concentration of KOH in the electrolyte is from 7 to 8 Molar.

4. The process of claim 2 in which the concentration of NaOH in the electrolyte is from 4.5 to 5.5 Molar.

5. The process of claim 1 in which the formation is carried out at a temperature between 50°C and 60°C.

6. The process of claim 1 in which the formation is carried out in a single charge-discharge cycle.

7. The process of claim 1 in which the electrode is a nickel electrode.

8. The process of claim 1 in which the electrode is a cadmium electrode.

9. The electrode produced by the process of claim 1.

10. An alkaline cell containing an electrode produced by the process of claim 1.

11. A battery consisting of at least two alkaline cells electrically connected in series in which at least one cell contains an electrode made by the process of claim 1.

* * * * *